(12) United States Patent
Kamen et al.

(10) Patent No.: US 6,356,280 B1
(45) Date of Patent: Mar. 12, 2002

(54) MECHANISM AND APPARATUS FOR REALISTIC 3D MODEL CREATION USING INTERACTIVE SCISSORS

(75) Inventors: Yakov Kamen, Cupertino; Leon Shirman, Redwood City, both of CA (US)

(73) Assignee: Isurftv, Sunnyvale, CA (US)

( * ) Notice: Subject to any disclaimer, the term of this patent is extended or adjusted under 35 U.S.C. 154(b) by 0 days.

(21) Appl. No.: 09/374,876

(22) Filed: Aug. 16, 1999

Related U.S. Application Data
(60) Provisional application No. 60/118,509, filed on Feb. 3, 1999.

(51) Int. Cl.$^7$ .............................................. G06T 11/60
(52) U.S. Cl. ........................................ 345/621; 345/421
(58) Field of Search ................................ 345/429, 431, 345/432, 421, 422, 581, 589, 620, 621, 625

(56) References Cited

U.S. PATENT DOCUMENTS 4,658,247 A * 4/1987 Gharachorloo
4,737,921 A * 4/1988 Goldwasser et al.
6,034,739 A * 3/2000 Rohlfing et al.
6,130,673 A * 10/2000 Pulli et al.

OTHER PUBLICATIONS

Schroeder et al., Decimation of Triangle Meshes, Proceedings of the 19th annual conference on Computer graphics, 1992, pp. 65–70.*
Renze et al., Generalized Unstructured Decimation, IEEE Computer Graphics and Applications, vol. 16, Issue: 6, Nov. 1996, pp. 24–32.*
Shirman et al., "Fast and Accurate Texture Placement", IEEE Computer Graphics and Applications, Jan.–Feb. 1997.

* cited by examiner

Primary Examiner—Jeffery Brier

(57) ABSTRACT

A 3D surface is defined in terms of a set of vertices. The 3D surface and a pixel array are used to generate a 3D image. Portions of the 3D surface are selectively removed using selected criteria. In one embodiment, the 3D surface is defined in terms of a set of triangles, and the triangles are tested for compliance with selected conditions. For example, the triangles can be tested to determine their slope. Based on these tests, the triangles are excised from the geometric surface. In one embodiment, the selected conditions are based on a combination of the slope of the triangles and the color of the pixels bound to the triangles.

5 Claims, 7 Drawing Sheets

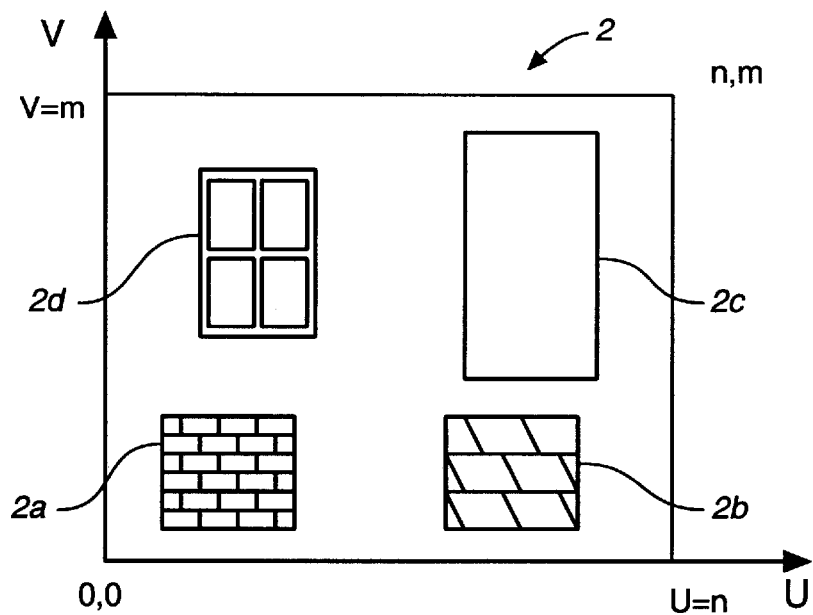
FIG._1A
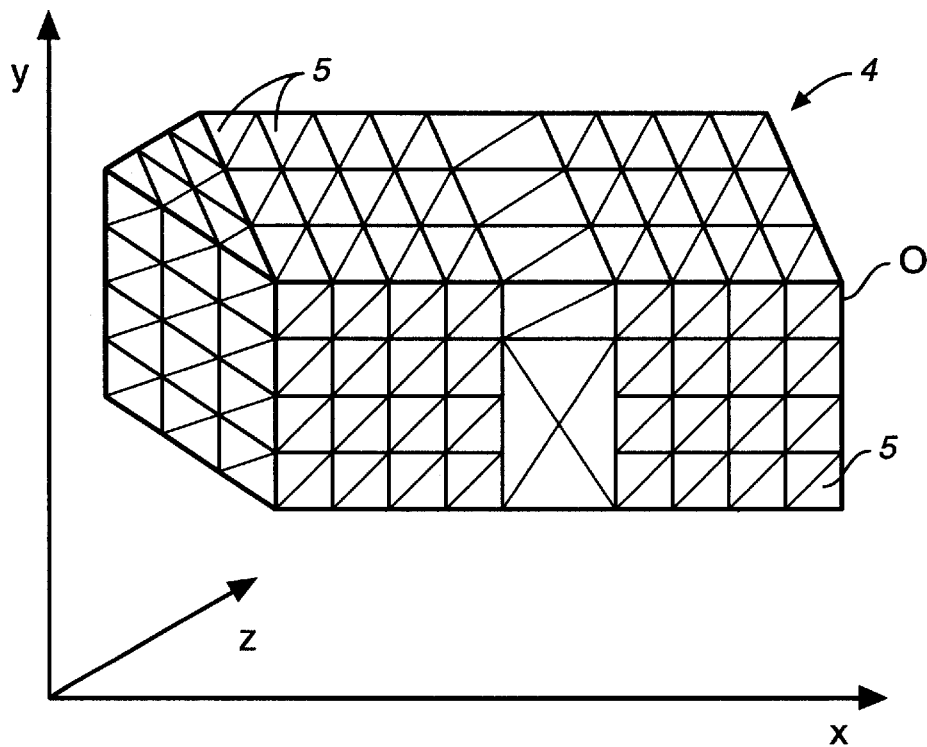
FIG._1B

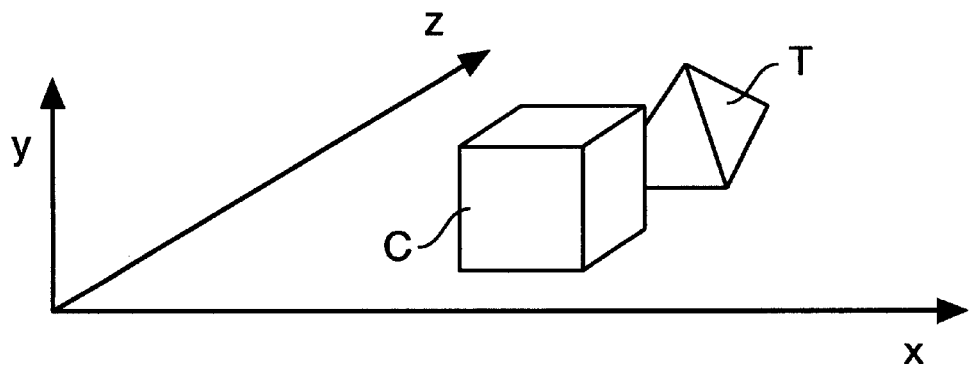
FIG._1C
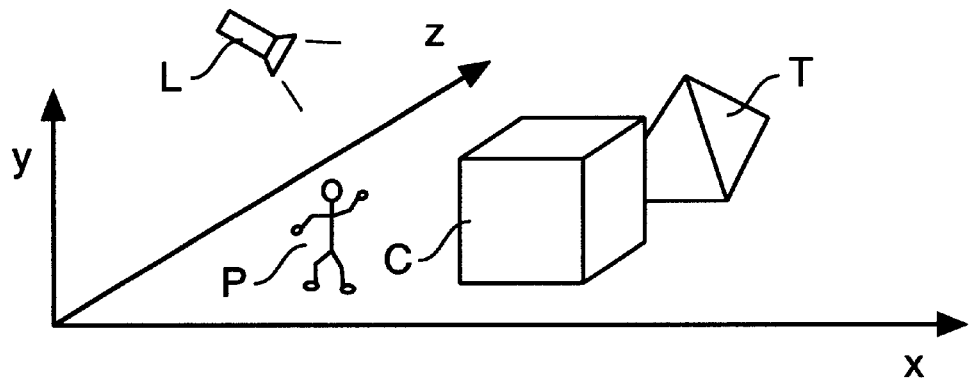
FIG._1D
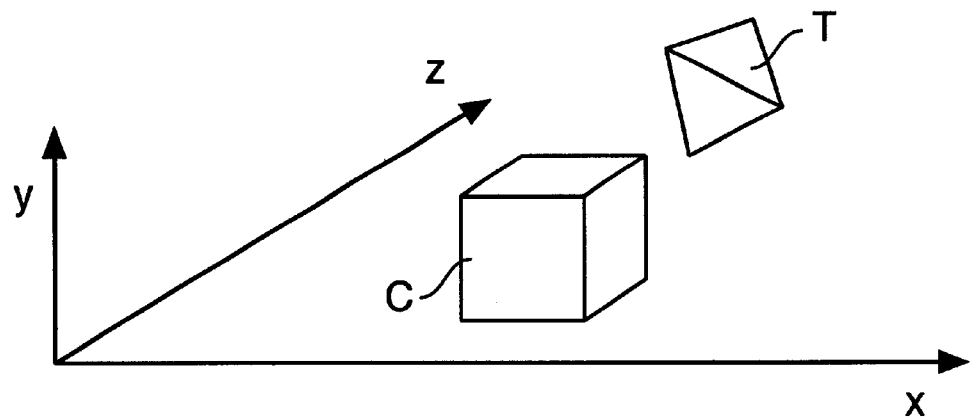
FIG._1E

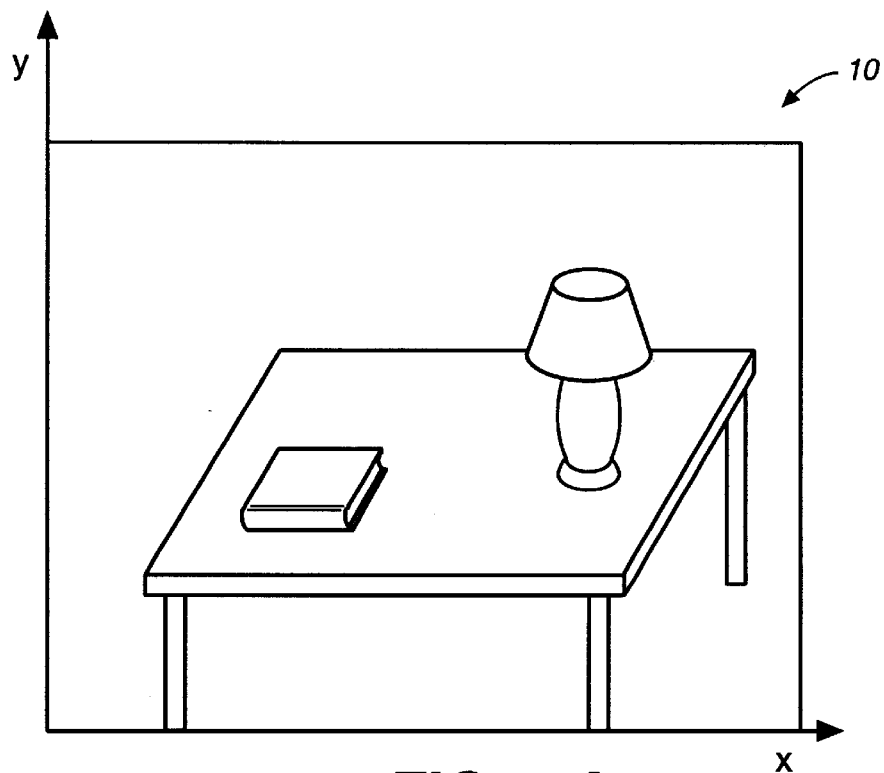
FIG._2A
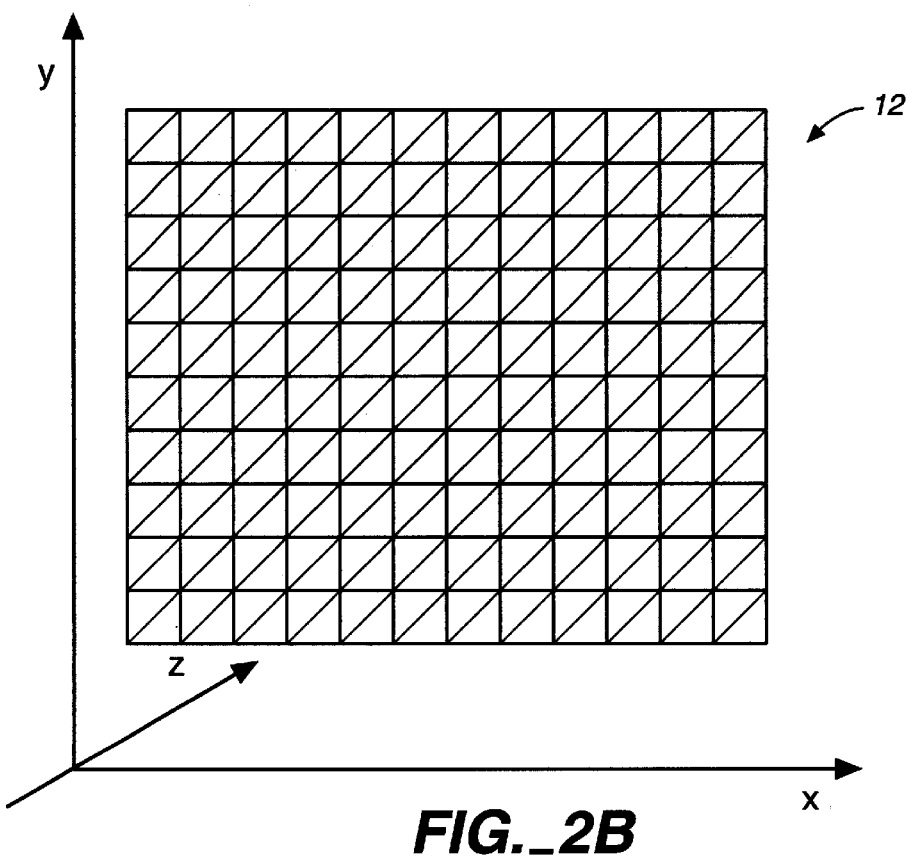
FIG._2B

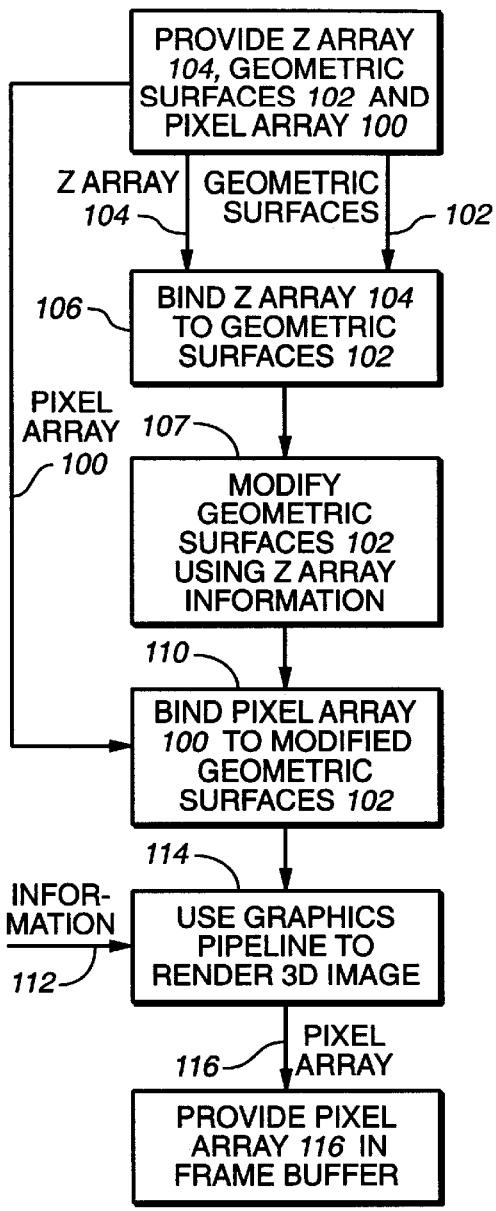
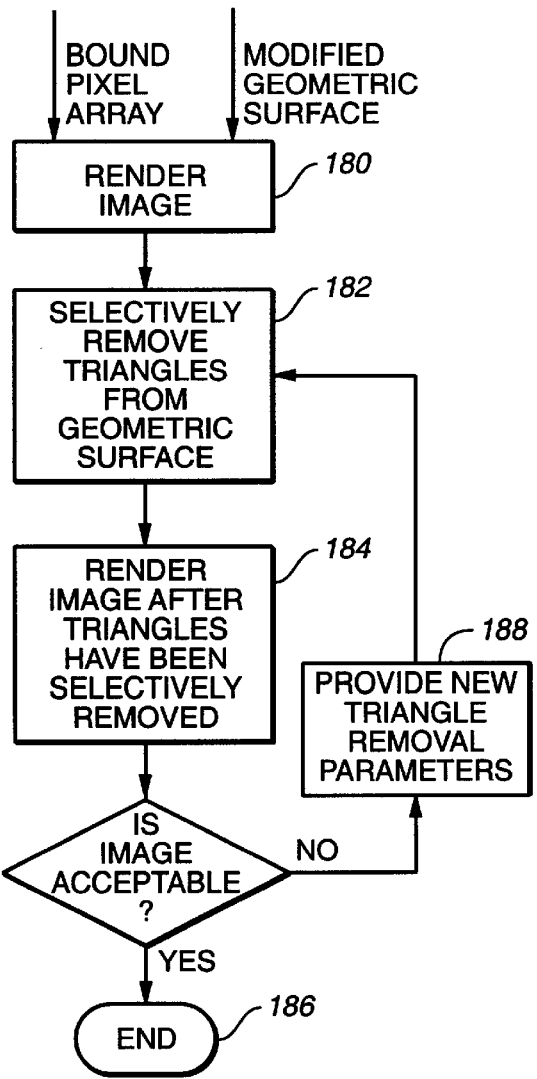
FIG._3    FIG._6

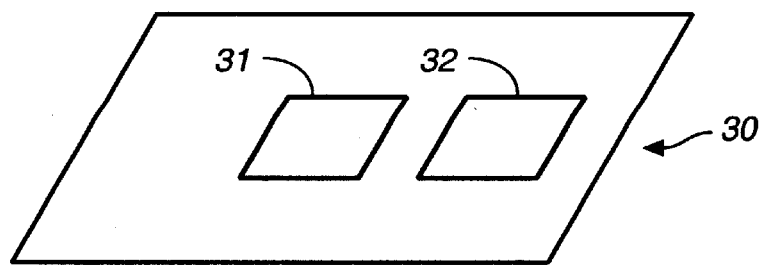
FIG._4A
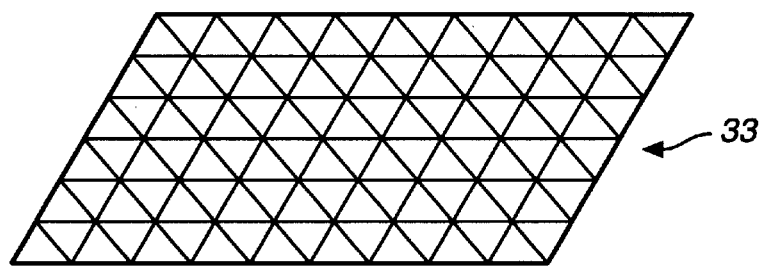
FIG._4B
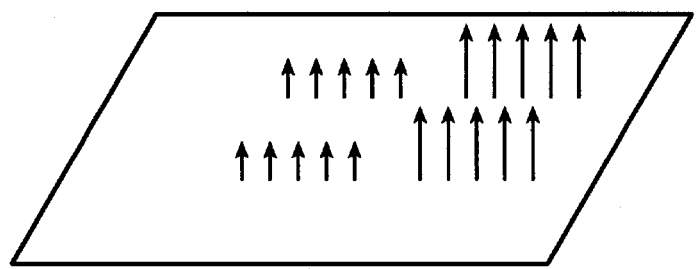
FIG._4C
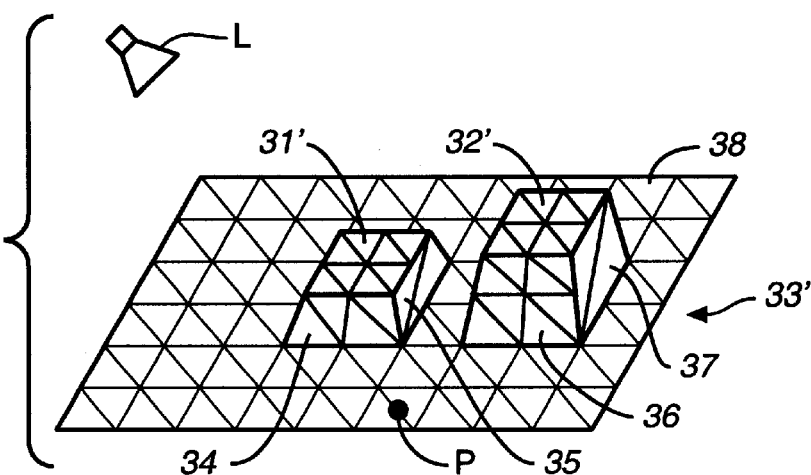
FIG._4D

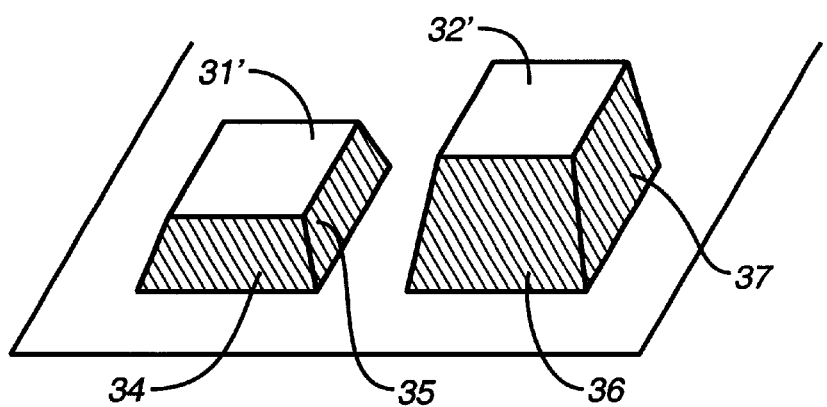
FIG._4E
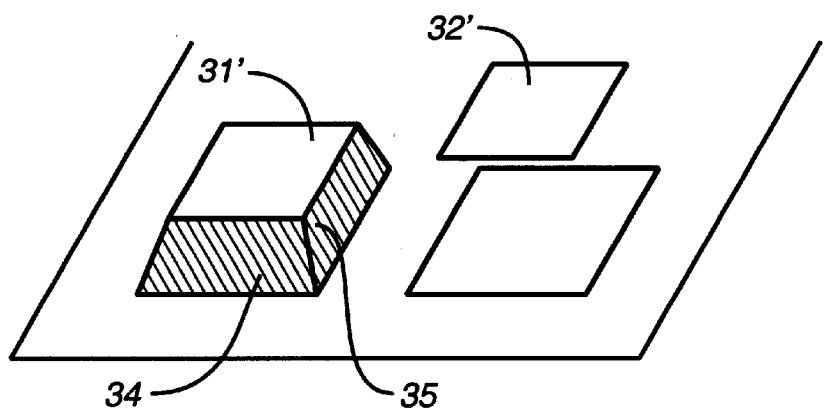
FIG._4F
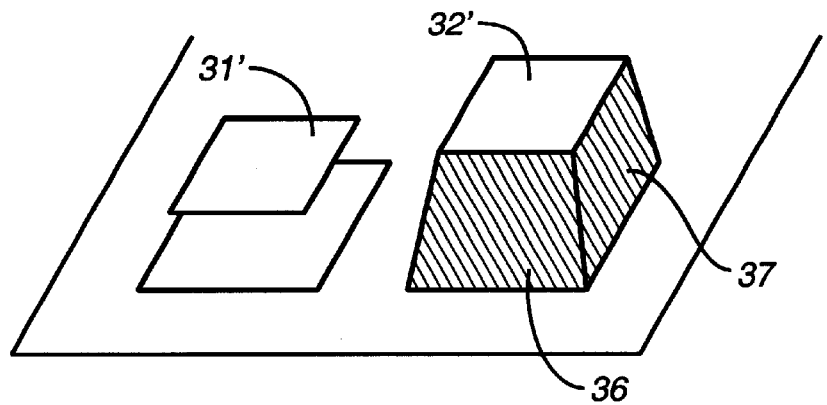
FIG._4G

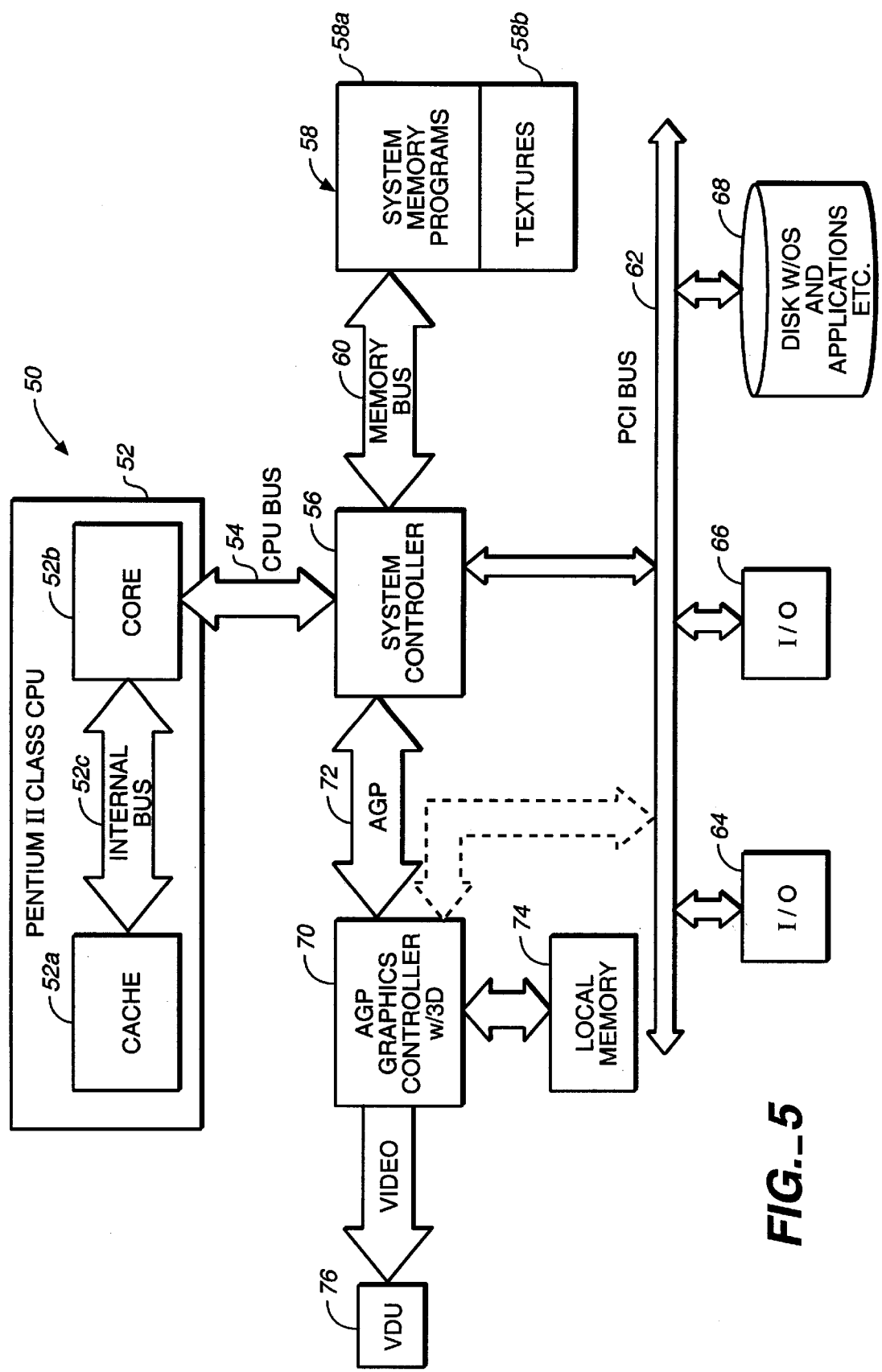
FIG._5

MECHANISM AND APPARATUS FOR REALISTIC 3D MODEL CREATION USING INTERACTIVE SCISSORS

CROSS-REFERENCE TO RELATED APPLICATIONS

This patent claims priority based on Provisional U.S. patent application Ser. No. 60/118,509, filed Feb. 3, 1999.

BACKGROUND OF THE INVENTION

This invention pertains to the field of 3D image construction.

Creating 3D objects in computer graphics is a complex task, which usually requires special equipment and tools. Conventionally, high quality 3D objects are created in two stages: at the first stage, the geometry is created and at the second stage, this geometry is digitally painted or texture mapped. Both stages are time consuming and expensive. This is typically accomplished using a 3D graphics pipeline.

U.S. patent application Ser. No. 09/361,470, filed Jul. 27, 1999, incorporated herein by reference in its entirety, describes a method and apparatus for receiving a 2D image, generating a 3D geometry, and digitally painting the 2D image over that 3D geometry. It is possible for the method of our '470 Application to result in certain unnecessary or anomalous geometric features. The present invention pertains to a method for excising those features.

In order to facilitate an explanation of the present invention, we will first describe how a 3D graphics pipeline generates a 3D image. We will then describe a method in accordance with the '470 Application for taking a 2D image and generating in response thereto a 3D image. We will then describe a method in accordance with the present invention for removing undesired geometric elements generated during the method in accordance with the '470 Application.

Description of a 3D Graphics Pipeline

The following is a simplified, general description of 3D graphics pipelines. It is not intended to describe any specific product (e.g. products mentioned later in this patent). Rather, the following description is merely a general explanation of 3D graphics pipelines to assist the reader's understanding.

Currently, when creating an image of an object with a 3D graphics pipeline, one provides as inputs to the pipeline a set of geometric surfaces and a "texture" that is used to "paint" the geometric surfaces. One way of constructing a geometric surface in a graphics pipeline is to create a "mesh" of "primitives." A "primitive" is a small geometric surface that can be defined by a set of vertices. For example, the primitive can be a polygon (e.g. a triangle or quadrilateral) defined within the pipeline in terms of the locations (in x, y and z coordinate space) of its corners or vertices. A set of primitives is used to define a larger 3D surface.

A 3D graphics pipeline constructs a 3D image of an object from a 2D texel array (typically called a "texture map"). FIG. 1A illustrates a 2D image 2 of a set of "textures." (As will be explained below, this texture map is used to create the image of an object—in this case, a house. Image 2 includes a portion 2a, which has the appearance of bricks, portion 2b, which has the appearance of roof shingles, portion 2c, which has the appearance of a door, and portion 2d which has the appearance of a window.) 2D image 2 is stored in a digital memory in the form of an array of texels. Each location in the memory stores a texel, which is one or more words of data indicating the color, color saturation and brightness corresponding to that texel. The location of the texels within the array is typically referred to as u, v coordinates (not to be confused with the Y, U and V signal names used to describe certain video signals). The u, v coordinates are similar to x, y coordinates of the Cartesian coordinate system. In FIG. 1A, the texel array is an n by m array, where n and m are integers.

As mentioned above, FIG. 1A represents a texel array. Physically, the array comprises data loaded into a memory. The texel array is not displayed as such on a CRT. Rather, as explained below, the texel array is used to create an image that is eventually displayed.

The next step in the process is to provide or prepare a geometric surface. In this example, the geometric surface is in the form of a mesh 4 of primitives 5 in three dimensional space (FIG. 1B). In the case of FIG. 1B, the primitives are triangles, but other types of polygons can be used. The mesh of primitives represents a three-dimensional shape of an object O in 3D space (in the case of FIG. 1B, the shape of a house). The position of each vertex of each triangle within mesh 4 is stored in a memory in the form of x, y and z Cartesian coordinates, relative to the object. These coordinates are sometimes referred to as model coordinates ("MC"). The process of preparing such a mesh is well-known, and described in standard graphics libraries, such as Real 3D, published by Real 3D, a Lockheed Martin Corporation, in 1996, and Direct 3D, published by New Riders Publishing in 1997.

The mesh of FIG. 1B is not displayed as such. Rather, the mesh of FIG. 1B is a representation of what is stored in a digital memory. Specifically, the memory stores the locations, in terms of x, y and z coordinates, of each vertex within mesh 4.

The next step is to map or "bind" the two-dimensional texture map of FIG. 1A onto mesh 4 of FIG. 1B. This is accomplished by mapping each triangle vertex to a location in the texture map. In effect, a list of data points is prepared that associates each vertex of mesh 4 to the u, v coordinates of a particular point (texel) in the texture map of FIG. 1A. (The locations in the texture map to which the vertices are bound are sometimes referred to as "control points.")

This portion of the process is roughly analogous to an upholsterer choosing a piece of fabric, and binding it with a few nails to the corner of a couch being upholstered (the nails are like control points). The upholsterer subsequently asks his apprentice to finish attaching the fabric to the couch. In this case, the 3D graphics pipeline finishes the task instead of an apprentice.

FIGS. 1A and 1B describe the process by which one texture map (FIG. 1A) is mapped onto one mesh 4 representing one object O. A graphics pipeline can, and often does, map one or several texture maps onto the same or several different objects.

The next step in the process is to set up a "world coordinate model" of the various objects to be displayed. This requires establishing a position and directional orientation for each object to be displayed. For example, supposing that instead of a house, two objects are to be viewed: a tetrahedron T and a cube C (FIG. 1C). During this portion of the process the pipeline is instructed that cube C is to be facing in a certain direction, and is to be located partially in front of tetrahedron T relative to a certain frame of reference. Again, the structure of FIG. 1C is not displayed per se. Rather, the graphics pipeline sets up processing of the model coordinates in accordance with the parameters of the position and orientation of the object.

The next step is to select a frame of reference. For example, it might be decided that the "viewer" will want to observe the objects from a position corresponding to a corner of the world coordinate model (e.g. position P in FIG. 1D). Thus, a virtual viewpoint, viewing direction and aperture will be selected. The parameters associated with this "viewer" define the screen coordinate (SC) system. Further, it might be decided the viewer will observe these objects with a light source located at a position L. The graphics pipeline will set up another processing pipe to process the world coordinate data into the screen coordinate data which will cause a computer screen to display the image as it would be perceived by the observer at position P (e.g. the image of FIG. 1D). In other words, the computer screen will provide an image of tetrahedron T and cube C as they would be observed by a viewer if he were standing at position P, and a light source were present at location L. This image will be provided initially as a pixel array in a frame buffer and then displayed by the computer screen. The image in the frame buffer is refreshed, i.e. regenerated according to the specifications programmed into the pipeline, typically at about 50 to 120 times per second. There are many different methods for optimizing the pipeline, and minimizing the time spent processing the invisible parts of the objects, such as the backside of cube C facing away from the viewer. Such details are well-known to those skilled in the art, and will not be discussed in detail here.

During the above-described of process constructing the pixel array and providing it in the frame buffer, the pipeline a) fetches the portion of texture map 2 "tacked" to the vertices of mesh 4 (and therefore stretched over each triangle); b) determines how and where that portion of the texture map should appear, given the orientation of the triangles relative to the viewer and the location of the light source; and c) constructs the appropriate bit map pixel array for storage in the frame buffer. The contents of this frame buffer are then displayed as an image on a computer screen.

Thereafter, the 3D graphics accelerator permits one to manipulate the displayed objects in any desired manner. For example, if one wants to rotate the image of tetrahedron T by 45° (FIG. 1E), the 3D graphics accelerator facilitates this manipulation. This is accomplished by providing a new set of parameters in the world coordinate model for the graphics pipeline indicating the new position and orientation for tetrahedron T. After this occurs, the next time the graphics pipeline regenerates the image stored in the frame buffer, the regenerated image will reflect this rotation of tetrahedron T.

Similarly, suppose that it is desired to display what would appear to the viewer if he took ten steps forward from his location at position P. The next time the graphics pipeline regenerates the image, it will generate and store another pixel array in the frame buffer corresponding to what would appear to such a viewer, and this pixel array is provided as another image on the computer screen.

It is thus seen that the graphics pipeline is extremely useful in applications such as video games, where it is desired to simulate what would appear to a game player if he were wandering past a set of objects.

Some graphics pipelines create models of geometric surfaces using an implicit technique. These surfaces are often described as a function of the position coordinates, i.e. f(x,y,z), or can also contain some vertices. Control points and additional formulas associated with such surfaces are used to bind a digital texel array (e.g. an array as shown in FIG. 1A) to the implicitly defined surface, and the process proceeds as described above. The major difference is that instead of defining surface areas in terms of primitives with vertices, the surface areas are defined in terms of mathematical equations.

Method In Accordance with U.S. patent application Ser. No. 09/361,470

Referring to FIGS. 2A and 2B, a method in accordance with our '470 Application for creating a 3D model based on a 2D image begins with the step of providing a) a 2D image 10 (e.g. a book on a table) in the form of an array pixels (shown in FIG. 2A), and b) a set of geometric surfaces 12 (shown in FIG. 2B). The 2D image can be a photograph generated by a digital camera, a video image, or any other type of image. Our '470 Application explains that the geometric surfaces can be a grid of polygons or they can be implicitly defined. For ease of explanation, we will focus primarily on the case in which the geometric surfaces are a grid of polygons, and in particular, triangles. In such an embodiment, a memory stores the locations of the vertices of these triangles (in terms of their x, y and z coordinates). (The triangles are not displayed as such. Rather, the locations of the triangle vertices are stored in a memory.) In a typical embodiment, the triangles are all located in a common plane.

Together with the 2D image (provided in the form of an array of pixels, e.g. pixel array 100 in FIG. 3) additional information about image-related "intrinsic" 3D geometry is provided. Our '470 Application refers to this additional information as "Z array" 104. The data stored within the Z array is referred to as a "displacement coefficient." While most objects are three-dimensional, a picture of an object is two-dimensional. The Z array contains information (the displacement coefficients) about the shape of the object depicted in the 2D image. For example, suppose the 2D image is an image of a book on a table (FIG. 2A). Books have a certain thickness. The displacement coefficients within the Z array describe the object depicted in the 2D pixel array, except instead of containing information about the color, brightness, hue or saturation of the object, the Z array contains information concerning the height of the surface of the book. In particular, each location within the Z array stores a displacement coefficient indicating the height of a portion of the surface of the book.

In the '470 method, Z array 104 is "bound" to geometric surfaces 102 (step 106 of FIG. 3). This is done in a manner similar to the binding of a prior art texel array to a geometric surface. Thus, each vertex within geometric surface 102 is associated with a location (in terms of x, y coordinates) within Z array 104.

If a Z array data location bound to a vertex of geometric surface 102 is a control point, then the displacement coefficient corresponding to that Z array location is assigned to that vertex. That vertex's Z coordinate is then displaced by a distance that is proportional to the displacement coefficient. In other words, the vertex's coordinates are modified, and the vertex is moved in the Z direction by a distance proportional to the displacement coefficient.

If the Z array location bound to a vertex of geometric surface 102 is not a control point then the Z position for that vertex is interpolated as a weighted sum of the values of its neighbor control points. In other words, the position (in the Z direction) of each non-control point vertex is recalculated by interpolation as a function of the surrounding control point Z positions.

Thereafter, pixel array 100 is bound to modified geometric surface 102 in a manner similar to the manner in which conventional texel arrays are bound to a geometric surface (step 110 in FIG. 3).

Thereafter, the parameters for the 3D graphics pipeline are established. For example, information 112 is provided corresponding to how the modified geometric surface is to be positioned in the world coordinate system, the location of a virtual viewer, and a location for a virtual lighting source. A 3D graphics pipeline takes this information and uses it to render an image (step 114 of FIG. 3) and provide that image in the form of a pixel array 116 in a frame buffer. The contents of the frame buffer are then displayed on a device such as a CRT.

The information in the Z array can come from any of a number of sources, e.g. an image analyzer, a camera equipped to perceive depth, etc. Unfortunately, when using one of these automated techniques for generating Z array 104, certain unnecessary modifications to the geometric surface can be made, and therefore, certain portions of the geometric surface 102 become unnecessary or undesirable. Accordingly, it would be desirable to provide a method for removing these portions of geometric surface 102 before the image is rendered by the graphics pipeline.

SUMMARY

A method in accordance with one embodiment of our invention comprises the step of selectively eliminating certain portions of a geometric surface to improve the appearance of an image being rendered. In one embodiment, we eliminate portions of a geometric surface that have too steep a slope. For example, in an embodiment in which the geometric surface is described in terms of a set of triangles, we perform the step of eliminating those triangles meeting the following condition:

$$\max(z0, z1, z2) - \min(z0, z1, z2) < e.$$

where the term "$\max(z0, z1, z2)$" means the largest z value for any vertex in the triangle, $\min(z0, z1, z2)$ means the smallest z value for any vertex in the triangle, and e is a threshold variable.

In another embodiment, we eliminate those triangles in which $\max(z0, z1, z2) - \min(z0, z1, z2)$ falls within a particular range of values.

In one embodiment of our invention, along with a first pixel array that contains a two-dimensional image to be bound to the geometric surface, a second array is provided. In this embodiment, the decision as to which triangles to eliminate is based at least partially on the data contained in this second array. In one version of this embodiment, the second array is an image containing depth information. This depth information describes 3D characteristics of the object depicted in the first pixel array.

In yet another embodiment of our invention, the decision as to which portions of the geometric surface are to be cut is based on color information in the pixel array. For example, we can eliminate certain "color key" based areas. The decision to eliminate such areas is made based on a combination of two or more conditions. For example, in one version of this embodiment we eliminate those triangles in which $\max(z0, z1, z2) - \min(z0, z1, z2) < e$ and $\min(z0, z1, z2) < L$, were L is a color key threshold. L is calculated as a function of the color of the pixels that are bound to those particular triangles. Triangle elimination can also be based on color information alone.

In one embodiment of our invention, we subdivide portions of the geometric surface to enhance the sharpness of the cuts that we make to the geometric surface. For example, for the case in which the geometric surface comprises a mesh of polygons such as triangles, we subdivide the triangles into smaller triangles to enhance the sharpness of the cuts that we make. We also can subdivide each surface (e.g., each triangle) before we selectively eliminate triangles to increase the quality of the image.

In one embodiment, the above editing can be done interactively, and the user can decide whether or not to implement a given cut or triangle subdivision, e.g. after viewing the results of the cut or subdivision.

BRIEF DESCRIPTION OF THE DRAWINGS

FIGS. 1A to 1E illustrate the operation of a 3D graphics pipeline. During this operation, a texel array is bound to a geometric surface.

FIG. 2A illustrates an image of a book on a table.

FIG. 2B illustrates a model of a flat geometric surface to which the image of FIG. 2A is to be bound.

FIG. 3 is a flow diagram illustrating a method in accordance with our '470 Application.

FIG. 4A illustrates a 2D image used to generate an image of a 3D object during a method in accordance with our '470 Application.

FIG. 4B illustrates a flat geometric surface.

FIG. 4C symbolically shows a Z array used to modify the flat geometric surface of FIG. 4B to reflect the three-dimensional shape of the object to be rendered.

FIG. 4D illustrates the geometric surface of FIG. 4B after it has been modified to reflect the three-dimensional shape of the object to be rendered.

FIG. 4E illustrates a rendered image based on the modified geometric surface of FIG. 4D and the 2D image of FIG. 4A.

FIG. 4F illustrates the image of FIG. 4E after portions of the geometric surface of a selected steepness have been excised.

FIG. 4G illustrates the image of FIG. 4E after different portions of the geometric surface have been excised.

FIG. 5 is a block diagram showing a computer system that can be used to perform a method in accordance with the present invention.

FIG. 6 is a flow diagram illustrating a method in accordance with the present invention.

DETAILED DESCRIPTION

As explained above, a method in accordance with our '470 Application comprises the steps of:
1. providing a 2D image in a pixel array;
2. providing a "Z array" which contains information concerning 3D characteristics of the object depicted in the 2D image;
3. providing a geometric surface; and
4. modifying the geometric surface in accordance with the information in the Z array so that the geometric surface reflects the shape of the object depicted in the 2D image.

Our '470 Application explains:
1. The Z array can be generated from any of a number of sources, e.g. an image analyzer or a camera equipped with depth perception.
2. Examples of image analyzer algorithms are provided.
3. The Z array can be subjected to a filter before being used to modify the geometric surface.

An embodiment of our invention can include these features, and as mentioned above, the '470 Application, in its entirety, is incorporated herein by reference.

FIGS. 4A to 4E show a highly simplified example of a method in accordance with the '470 Application for modifying a geometric surface. FIG. 4A illustrates a 2D image 30 including two objects to be displayed—a square 31 and a square 32. FIG. 4B illustrates a geometric surface 33 (an array of triangles) that are to be used by a graphics pipeline to display image 30. Also received is a Z array (symbolically shown as a set of vectors in FIG. 4C) which is an array of data containing displacement coefficients representing the height of the objects to be displayed. The data in the Z array is bound to geometric surface 33, and geometric surface 33 is then modified in accordance with the Z array. Suppose that the Z array indicates that the height of the surface of square 31 is to be 1 inch, and the height of square 32 is to be two inches. Thus, in this example, geometric surface 33 of FIG. 4B is modified to become geometric surface 33' of FIG. 4D. (Geometric surfaces 33 and 33' are not displayed as such—rather, they are stored in memory in the form of vertex locations for each of the triangles in surfaces 33, 33'. These locations are in terms of their x, y and z coordinates.) As can be seen, geometric surface 33' includes two square-shaped raised surfaces 31', 32', and walls 34, 35, 36 and 37 leading from a planar floor 38 up to surfaces 31', 32'. (There is no significance to these particular shapes. These are mere examples that are provided to explain the method of the '470 Application.)

FIG. 4E shows how a graphics pipeline might generate an image based on the Z array, image 30 and geometric surface 33 for a virtual viewer looking at objects 31 and 32 from a position P with a lighting source L.

During a method in accordance with the present invention, after modifying the geometric surface, but before rendering an image, two tests are performed on each triangle: an elimination threshold test and a zone of action test. If a triangle fails to pass either of these tests, it is eliminated from the geometric surface, and will not be used to render an image. (The user can modify the parameters of these tests in real time, thereby editing the image.)

Our method and apparatus supports multiple criteria and tests for geometry elimination. These criteria include the following:

Threshold Criteria

In one embodiment, we eliminate portions of the geometric surface based on the equation $F(Z)<E$, were F is a function of the surface z coordinates and E is a threshold number. In a practical case in which the geometry primitives are triangles, $F(Z)$ can be simplified as $F(z0,z1,z2)$, where $z0$, $z1$, and $z2$ are z-coordinates of the three vertices of the triangle.

Below we describe several tests that we believe are useful.

Steepness Test

During the steepness test, each triangle is tested to determine whether the following condition is true:

$$\max(z_0, z_1, z_2) - \min(z_0, z_1, z_2) < e$$

where $z_0$, $z_1$, and $z_2$ are the z coordinate values for the three vertices of a triangle, $\max(z_0, z_1, z_2)$ equals the greatest of the three z coordinate values, $\min(z_0, z_1, z_2)$ equals the smallest of the three z coordinate values, and e is a selected threshold value. Any triangles meeting this condition are eliminated. Such elimination of triangles is useful for isolating selected objects from the background of the image.

In effect, triangles of a certain steepness are eliminated by this test. FIG. 4F illustrates the effect on the image of FIG. 4E of eliminating triangles using this threshold test for a particular value of e. As can be seen, steep walls 36 and 37 of square 33' are eliminated.

Zone of Action Test

A set of intervals is provided, each interval being characterized by a lower value and an upper value. For each interval i, each triangle is tested to determine whether $\max(z_0, z_1, z_2) - \min(z_0, z_1, z_2)$ is within $(a_i, b_i)$, where $a_i$ is the lower bound for interval i and $b_i$ is the upper bound for interval i. In this way, one can eliminate triangles having a certain range of steepnesses. Thus, depending upon values $a_i$, $b_i$, application of the zone of action test might eliminate walls 34 and 35, but not walls 36 and 37. One would thus be left with an image as shown in FIG. 4G.

In one embodiment, $a_i$ and $b_i$ are functions of the color of the pixels bound to the triangle vertices. In another embodiment, $a_i$ and $b_i$ are functions of the color of the pixels bound to the triangle as a whole. To describe this process in another way, the zone of elimination is determined by image color parameters. For instance the zone of elimination can be all triangles having a certain slope that depends upon the luminance of the pixels corresponding to the three vertices.

In another embodiment, triangles are eliminated as a function solely of image color parameters. For example, triangles can be eliminated when luminance of the pixels corresponding to three vertices is between 0.2 and 0.3 (in a normalized luminance scale). Alternatively, triangles can be eliminated when the pixels are a certain color, hue or brightness.

This flexibility in being able to remove triangles permits one to perform many useful image editing operations. For example, one can separate one type of image from the background. Alternatively, one can separate adjacent structures in an image. Typically, an object that one might want isolated from the background or from other objects is distinguishable both by its color (or color-related parameters such as luminance) and the slope of its surfaces. Thus, the method and apparatus of our invention are well-adapted to performing such isolation tasks.

Elimination of triangles within geometric surfaces can be done interactively. For example, one might provide a geometry, Z array and 2D image, and then display that image. If the image looks inappropriate, one might input to the system a value e, or interval variables $a_i$, $b_i$. One could then have the graphics pipeline regenerate the image to determine whether it looks appropriate. This could be done as an iterative image editing process, e.g. by providing appropriate commands and threshold values to CPU 52 via a keyboard. (See FIG. 5 and the description of FIG. 5 below.) The threshold values can be the interval variables, the value "e" discussed above, or other parameters. In one embodiment, the various calculations and comparisons, as well as the excising of triangles, can be performed by CPU 52.

The excising of triangles can be performed by removing triangles from the list of triangles within a memory array, tagging certain triangles so that they are ignored by a 3D graphics pipeline during rendering, or by other techniques. The triangles can be stored in one of the memories illustrated in FIG. 5, e.g. memory 58 or 74.

In one embodiment, in lieu of eliminating triangles within the geometric surface, one can subdivide triangles into other triangles to determine whether that improves the image. Of importance, eliminating triangles without subdividing triangles can result in an image having jagged edges, particularly if a large triangle size has been chosen for binding. If one subdivides triangles at those edges, the jaggedness of the resulting image can be reduced. Each triangle, which supposed to be deleted in the testing procedure can be additionally subdivided to minimize aliasing. (Subdividing is discussed by Shirman et al., "Fast and Accurate Texture Placement", IEEE Computer Graphics and Applications, January–February 199, p. 60–66, incorporated herein by reference.)

Hardware and Software for Practicing an Embodiment of a Method in Accordance with our Invention One embodiment of our invention can be practiced using a PC having the following:
1. A CPU such as a Celeron or Pentium, e.g. as manufactured by Intel, or a K6 processor, e.g. as manufactured by Advanced Micro Devices.
2. 32 MB of memory or greater.
3. A 3D HW adapter. This is a type of graphics card currently available on the market. The 3D HW adapter should have 4 MB of memory (preferably 8 MB) and an advanced graphics port (AGP) interface. (An AGP interface is a type of bus standard that is well-known in the art.) Alternatively, a peripheral connection interface ("PCI") can be used in lieu of an AGP. The PCI is a type of bus standard that is well known in the art. Examples of appropriate 3D HW adapters include the TNT-2 available from Riva, the ATI Rage 128, the Matrox G400, the Trident Blade 3D and the S3 Savage.
4. The operating system can be Windows 95, Windows 98, Win2000, or any other operating system that supports direct 3D. The Windows operating system includes a standardized platform called Direct X for Windows.

In one embodiment, a user sets up the flat geometric surface (for example, a triangle mesh) in the Direct 3D windows environment. The set of instructions is then provided to the graphics pipeline, which finishes the rendering process. However, in another embodiment, the PC comprises a bypass mechanism that permits one to access the hardware accelerator directly using a software interface provided by the graphics card manufacturer.

FIG. 5 is a block diagram of a computer system 50 for performing a method in accordance with our invention. Referring to FIG. 5, system 50 comprises a CPU 52, e.g. a Pentium II class CPU, comprising a cache memory 52a, a core 52b and an internal bus 52c for facilitating communication between core 52b and cache 52a. Core 52b communicates via a CPU bus 54 to a system controller 56. System controller 56 communicates with the system memory 58 via a memory bus 60. System memory 58 includes a first portion 58a which stores system memory programs and a second portion 58b that stores the texture maps such as described above.

Also included in system 50 is a PCI bus 62 for facilitating communication between system controller 56 and I/O devices 64, 66 and disk drive 68. I/O device 64 can be any type of I/O device. In one embodiment, I/O device 66 is a video capture card with a driver. Data from the video capture card is either loaded by DMA (direct memory access) or CPU 52 into a frame buffer, typically within main memory 58. However, the frame buffer may be in other memories within system 50.

System 50 also includes an AGP graphics controller 70 comprising a 3D accelerator. In one embodiment, AGP graphics controller 70 communicates with system controller 56 via an AGP bus 72. In an alternative embodiment, AGP graphics controller 70 can communicate with system controller 56 via PCI bus 62 (e.g. as shown in phantom in FIG. 5).

Graphics controller 70 uses its own local memory 74 to generate and store pixel arrays to be displayed on a video display unit 76.

It is emphasized that system 50 is only one example of a system that performs a method in accordance with our invention. Other hardware can be used as well.

The interactive scissors function can be performed by the CPU operating on information stored within memory 58 pertaining to the location of the vertices in the geometric surface. Alternatively, the values e, $a_i$, and/or $b_i$ can be passed to the graphics pipeline, and the graphics pipeline can attend to elimination of undesired portions of the geometric surface.

FIG. 6 is a flow diagram schematically showing an embodiment of one method in accordance with our invention. Referring to FIG. 6, one provides a model of a 3D surface that has been modified in accordance with a Z array, a pixel array that has been bound to the geometric surface as discussed above. In block 180, an image is rendered by the 3D graphics pipeline and displayed on VDU 76. The modified geometric surface, pixel array, and a set of parameters for testing and removing triangles within the geometric surface are used to selectively remove triangles from the geometric surface (block 182). During this step, triangles within the geometric surface can be subdivided. The information provided to block 182 can be stored in a memory device, e.g. one of the memory devices in the block diagram of FIG. 5 such as memory 58. Alternatively, the testing parameters for removing triangles can be input by a user. Thereafter, the image is rendered by the 3D graphics pipeline again (block 184). If this image is acceptable, then this editing procedure is finished (block 186). If not, new parameters are selected for removing triangles from the geometric surface (block 188). These parameters can be selected from memory 58, or can be input by a user. The procedure continues until the image is acceptable. As mentioned above, the selective removal can be performed by CPU 52.

While the invention has been described with respect to specific embodiments, those skilled in the art will appreciate that changes can be made in form and detail without departing from the spirit and scope of the invention. For example, instead of basing the above calculations on Z axis values, values along other axes or combinations of axes can be used, e.g. the X or Y axes. When generating the Z array, one can use an image analyzer, e.g. as described in our '470 application. One can also digitally filter the Z array data, e.g. as described in our '470 Application. In lieu of defining geometric surfaces in terms of triangles, other polygons, can be used, e.g. quadrilaterals, pentagons, etc. In yet another embodiment, the geometric surfaces can be defined using the implicit technique. Accordingly, all such changes come within our invention.

We claim:
1. A method comprising:
providing a model of a geometric surface, said model comprising a set of portions of said geometric surface, said model being stored in a memory device, said model comprising a plurality of polygons;
excising at least some of said portions of said geometric surface in response to the slope of said some of said portions; and
displaying an image on a display device based on said geometric surface after said portions have been excised, wherein said polygons are excised in accordance with the formula:

$$\text{Max}(A0, A1, \ldots An) - \text{Min}(A0, A1, \ldots An) < e$$

where $\text{Max}(A0, A1, \ldots An)$ is the largest coordinate value of any of the polygon vertex coordinates along an axis, $\text{Min}(A0, A1, \ldots An)$ is the smallest coordinate value of any of the polygon vertex coordinates along said axis, and e is a threshold value.

2. Method of claim 1 wherein said axis is the Z axis.

3. A method comprising:
   providing a model of a geometric surface, said model comprising a set of portions of said geometric surface, said model being stored in a memory device, said model comprising a plurality of polygons;
   excising at least some of said portions of said geometric surface in response to the slope of said some of said portions; and
   displaying an image on a display device based on said geometric surface after said portions have been excised, wherein said polygons are excised in accordance with the formula:

$$a_i < \text{Max}(A0, A1, \ldots An) - \text{Min}(A0, A1, \ldots An) < b_i$$

where $\text{Max}(A0, A1, \ldots An)$ is the largest coordinate value of any of the polygon vertex coordinates along an axis, $\text{Min}(A0, A1, \ldots An)$ is the smallest coordinate value of any of the polygon vertex coordinates along said axis, and $a_i$ and $b_i$ constitute a range of values.

4. Method of claim 3 wherein said axis is the Z axis.

5. Method of claim 3 wherein $a_i$ and $b_i$ are functions of the color of pixels bound to the polygon.

* * * * *